US009222224B2

(12) United States Patent
Shannon

(10) Patent No.: US 9,222,224 B2
(45) Date of Patent: *Dec. 29, 2015

(54) TISSUE PRODUCT COMPRISING BAMBOO

(71) Applicant: Kimberly-Clark Worldwide, Inc., Neenah, WI (US)

(72) Inventor: Thomas Gerard Shannon, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,929

(22) Filed: Jun. 5, 2014

(65) Prior Publication Data

US 2014/0284010 A1    Sep. 25, 2014

Related U.S. Application Data

(63) Continuation of application No. 13/874,034, filed on Apr. 30, 2013, now Pat. No. 8,778,505, which is a continuation of application No. 09/212,011, filed on Sep. 21, 2011, now Pat. No. 8,524,374.

(51) Int. Cl.
| | |
|---|---|
| *D21H 27/38* | (2006.01) |
| *B32B 5/02* | (2006.01) |
| *B32B 5/26* | (2006.01) |
| *D21H 11/12* | (2006.01) |
| *D21H 27/00* | (2006.01) |
| *D21H 27/30* | (2006.01) |
| *D21H 25/04* | (2006.01) |

(52) U.S. Cl.
CPC ............... *D21H 27/38* (2013.01); *B32B 5/022* (2013.01); *B32B 5/26* (2013.01); *D21H 11/12* (2013.01); *D21H 27/002* (2013.01); *D21H 27/30* (2013.01); *B32B 2262/065* (2013.01); *B32B 2262/067* (2013.01); *B32B 2555/00* (2013.01); *B32B 2555/02* (2013.01); *D21H 25/04* (2013.01); *Y10T 428/31971* (2015.04); *Y10T 428/31975* (2015.04); *Y10T 428/31978* (2015.04); *Y10T 428/31982* (2015.04); *Y10T 428/31986* (2015.04)

(58) Field of Classification Search
CPC .......... B32B 5/022; B32B 5/26; D21H 27/38; D21H 27/002; D21H 27/30; D21H 11/12; Y10T 428/31982; Y10T 428/31971; Y10T 428/31975; Y10T 428/31986; Y10T 428/31978
USPC ........................... 428/532, 533, 534, 535, 536
See application file for complete search history.

(56) References Cited

U.S. PATENT DOCUMENTS

| | | | |
|---|---|---|---|
| 6,797,114 B2 | 9/2004 | Hu | |
| 6,821,387 B2 | 11/2004 | Hu | |
| 8,524,374 B2 * | 9/2013 | Shannon | 428/532 |
| 8,778,505 B2 * | 7/2014 | Shannon | 428/532 |
| 2003/0111197 A1 | 6/2003 | Hu | |
| 2009/0266500 A1 | 10/2009 | Schubert et al. | |

FOREIGN PATENT DOCUMENTS

| | | |
|---|---|---|
| DE | 93 00 201 U1 | 5/1994 |
| EP | 1 319 749 A1 | 6/2003 |
| JP | 05-321190 A | 12/1993 |
| JP | 07-197400 A | 8/1995 |
| JP | 10-102392 A | 4/1998 |
| KR | 10-0547492 B1 | 1/2006 |
| KR | 2009-0036284 A | 4/2009 |
| KR | 10-2011-0060510 A | 6/2011 |
| WO | WO 2007/059789 A1 | 5/2007 |
| WO | WO 2007/112916 A1 | 10/2007 |
| WO | WO 2008/003343 A1 | 1/2008 |
| WO | WO 2008/044860 A1 | 4/2008 |
| WO | WO 2008/063014 A1 | 5/2008 |

OTHER PUBLICATIONS

"Morphology," Internet web page "http://www.inbar.int/publication/txt/tr18/MORPHOLOGY.htm", viewed and printed Mar. 31, 2011, pp. 1-3.
Haun, J.R. et al., "Fiber and Papermaking Characteristics of Bamboo," Technical Bulletin No. 1361, Agriculture Research Service, USDA, Aug. 1966, pp. 1-19.
Horn, Richard A. and Vance C. Setterholm, "Fiber Morphology and New Crops," Internet web page "http://www.hort.purdue.edu/newcrop/proceedings1990/v1-270.html", pp. 1-9, posted Aug. 28, 1997, from Advances in New Crops, Timber Press, Portland, OR, J. Janick and J.E. Simon (eds.), 1990, pp. 270-275.
Kamthai, Suphat and Pratung Puthson, "Effect of Beating Revolution on Sweet Bamboo (Dendrocalamus asper Backer) Kraft Pulp Properties," CMU Journal, vol. 4, No. 2, 2005, pp. 137-147.
Sekyere, Daniel, "Potential of Bamboo (Bambusa Vulgaris) as a Source of Raw Material for Pulp and Paper in Ghana," Ghana Journal of Forestry, vol. 1, 1994, pp. 49-56.
Sood, Y.V. et al., "Quality Improvement of Paper from Bamboo and Hardwood Furnish Through Fiber Fractionation," Journal of Scientific & Industrial Research, vol. 64, Apr. 2005, pp. 299-305.
Tamolang, Francisco N. et al., "Properties and Utilization of Philippine Erect Bamboos," Bamboo Research in Asia, proceedings of workshop, Singapore, May 28-30, 1980, pp. 189-200.
Zhao, Guanglei et al., "Replacement of Softwood Kraft Pulp with ECF-Bleached Bamboo Kraft Pulp in Fine Paper," BioResources, vol. 5, No. 3, 2010, pp. 1733-1744.

* cited by examiner

*Primary Examiner* — Leszek Kiliman
(74) *Attorney, Agent, or Firm* — Kimberly-Clark Worldwide, Inc.

(57) ABSTRACT

The disclosure provides tissue webs, and products incorporating the same, where the webs comprise wood and bamboo fibers. More specifically the disclosure provides soft and durable through-air dried tissue webs comprising at least about 10 percent bamboo fiber by weight of the web. In the through-air dried tissue webs of the present disclosure, bamboo typically replaces high average fiber length wood fibers, which increases the bulk of the through-air dried web without negatively effecting softness or durability.

20 Claims, 1 Drawing Sheet

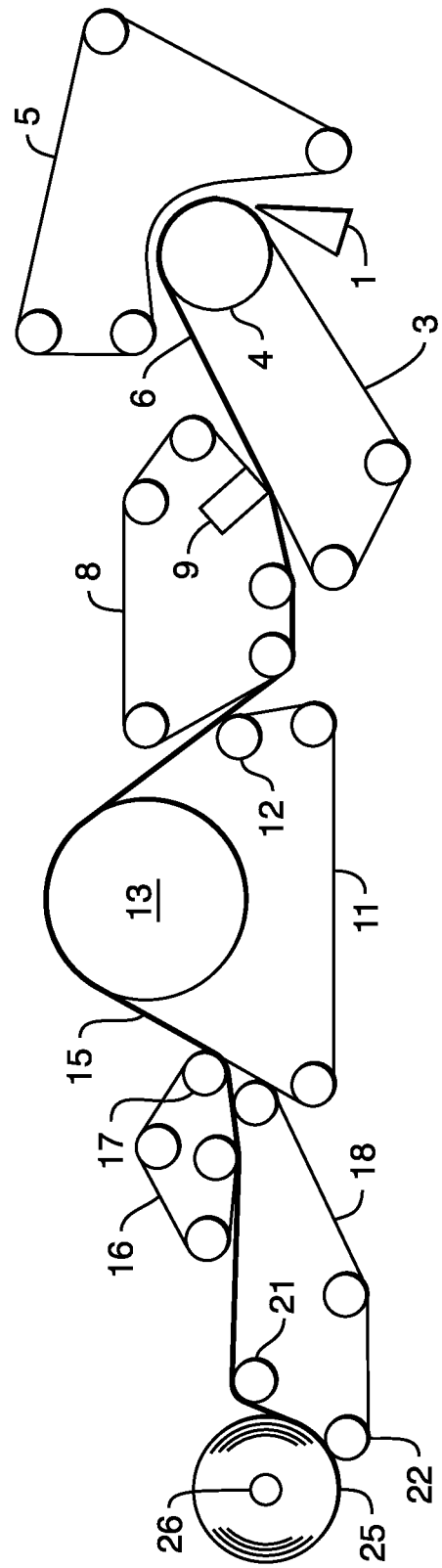

TISSUE PRODUCT COMPRISING BAMBOO

RELATED APPLICATIONS

The present application is a continuation application of, and claims priority to, U.S. patent application Ser. No. 13/874,034, filed on Apr. 30, 2014, which is a continuation application of, and claims priority to, U.S. patent application Ser. No. 13/238,826, filed on Sep. 21, 2011, now U.S. Pat. No. 8,524,374, all of which are incorporated herein by reference.

FIELD OF THE INVENTION

This disclosure relates to soft and durable through-air dried tissue webs, and tissue products comprising the same, wherein the tissue webs comprise wood and bamboo fibers. It has been discovered that replacing high average fiber length wood fibers with bamboo fibers in a through-air dried web increases sheet bulk without negatively effecting durability or stiffness.

BACKGROUND

Tissue products, such as facial tissues, paper towels, bath tissues, napkins, and other similar products, are designed to include several important properties. For example, the products should have good bulk, a soft feel, and should have good strength and durability. Unfortunately, however, when steps are taken to increase one property of the product, other characteristics of the product are often adversely affected.

Tissue products are made via one of two primary tissue manufacturing processes: conventional wet press (CWP) and through-air drying (TAD). In CWP, the tissue is formed on a forming fabric from either a suction breast roll or twin wire former and the embryonic web is transferred to a papermaking felt and dewatered by pressing with one or two pressure roll nips against the surface of a large steam heated cylinder called a Yankee dryer. The pressing process also assists in transfer of the sheet to the Yankee dryer surface. An adhesive solution is sprayed on the dryer surface prior to the sheet transfer in order to provide good bonding between the sheet and the dryer surface. The sheet is removed from the Yankee surface by a doctor blade in the creping process. In the TAD process, the sheet is formed on a forming fabric and transferred to one or more other fabrics as it is dewatered to a consistency of 25 percent or higher. After the initial dewatering the sheet is dried while in contact with the fabric by blowing hot air through the fabric until the consistency is 40 percent or higher. In conventional through-air dried processes, the through-air dried web is adhered to a Yankee dryer and creped. A roll may be present at the point of transfer to assist in the transfer of the web from the drying fabric to the Yankee dryer but absent the presence of high pressure used to dewater the web in the CWP process. Alternatively TAD tissue may be prepared without creping where foreshortening of the web occurs with a differential velocity transfer of the wet laid web from the forming fabric to a substantially slower moving, open mesh transfer fabric. Thereafter the web is dried while preventing macroscopic rearrangement of the fibers in the plane of the web. The web is then dried on a fabric in the through-air dryer to a consistency of 90 percent or higher and wound. No Yankee dryer is used in the uncreped through-air dried (UCTAD) process. Through-air dried tissue products are typically associated with higher quality tier tissue products than conventional wet pressed products due to their higher bulk and greater absorption capacity.

To achieve the optimum product properties, tissue products are typically formed, at least in part, from pulps containing wood fibers and often a blend of hardwood and softwood fibers to achieve the desired properties. Typically when attempting to optimize surface softness, as is often the case with tissue products, the papermaker will select the fiber furnish based in part on the coarseness of pulp fibers. Pulps having fibers with low coarseness are desirable because tissue paper made from fibers having a low coarseness can be made softer than similar tissue paper made from fibers having a high coarseness. To optimize surface softness even further, premium tissue products usually comprise layered structures where the low coarseness fibers are directed to the outside layer of the tissue sheet with the inner layer of the sheet comprising longer, coarser fibers.

Unfortunately, the need for softness is balanced by the need for durability. Durability in tissue products can be defined in terms of tensile strength, tensile energy absorption (TEA), burst strength and tear strength. Typically tear, burst and TEA will show a positive correlation with tensile strength while tensile strength, and thus durability, and softness are inversely related. Thus the paper maker is continuously challenged with the need to balance the need for softness with a need for durability. Unfortunately, tissue paper durability generally decreases as the average fiber length is reduced. Therefore, simply reducing the pulp average fiber length can result in an undesirable trade-off between product surface softness and product durability.

Besides durability long fibers also play an important role in overall tissue product softness. While surface softness in tissue products is an important attribute, a second element in the overall softness of a tissue sheet is stiffness. Stiffness can be measured from the tensile slope of stress-strain tensile curve. The lower the slope the lower the stiffness and the better overall softness the product will display. Stiffness and tensile strength are positively correlated, however at a given tensile strength shorter fibers will display a greater stiffness than long fibers. While not wishing to be bound by theory, it is believed that this behavior is due to the higher number of hydrogen bonds required to produce a product of a given tensile strength with short fibers than with long fibers. Thus, easily collapsible, low coarseness long fibers, such as those provided by Northern Softwood Kraft (NSWK) fibers typically supply the best combination of durability and softness in tissue products when those fibers are used in combination with hardwood Kraft fibers such as *Eucalyptus* hardwood Kraft fibers. While Northern Softwood Kraft Fibers have a higher coarseness than *Eucalyptus* fibers their small cell wall thickness relative to lumen diameter combined with their long length makes them the ideal candidate for optimizing durability and softness in tissue.

Unfortunately, supply of NSWK is under significant pressure both economically and environmentally. As such, prices of NSWK fibers have escalated significantly creating a need to find alternatives to optimize softness and strength in tissue products. Another type of softwood fiber is Southern Softwood Kraft (SSWK) widely used in fluff pulp containing absorbent products such as diapers, feminine care absorbent products and incontinence products. Unfortunately while not under the same supply and environmental pressures as NSWK, fibers from SSWK are too coarse for tissue products and are unsuitable for making soft tissue products. While having long fiber length, the SSWK fibers have too wide a cell wall width and too narrow a lumen diameter and thus create stiffer, harsher feeling products than NSWK.

The tissue papermaker who is able to obtain pulps having a desirable combination of fiber length and coarseness from fiber blends generally regarded as inferior with respect to average fiber properties may reap significant cost savings and/or product improvements. For example, the papermaker may wish to make a tissue paper of superior strength without incurring the usual degradation in softness which accompanies higher strength. Alternatively, the papermaker may wish a higher degree of paper surface bonding to reduce the release of free fibers without suffering the usual decrease in softness which accompanies greater bonding of surface fibers. As such, a need currently exists for a tissue product formed from a fiber that will improve durability without negatively affecting other important product properties, such as softness.

Outside of Northern and Southern softwood pulp fibers very few options exist for papermakers when selecting long fibers. Bamboo fibers have been used in paper for many years primarily in India and China. Long and short fiber bamboo species are reported. Bamboo fibers have been used to replace wood fibers in blended, conventional wet pressed tissue products in India and China. Unfortunately commercially available bamboo pulps comprise a mixture of species of bamboos including long and short fibers. Length weighted average fiber lengths are significantly shorter than northern and southern softwood pulp fibers. In addition, the bamboo pulps contain a high portion of primary fines in the form of parenchyma cells. It is well known that the presence of high levels of fines in tissue products create a decrease in surface softness and an increase in stiffness of tissue sheets. Thus, tissue sheets comprising high amounts of bamboo fibers tend to be less soft than those comprising wood fibers. Moreover, given the relatively short fiber length and high level of primary fines, bamboo pulp fibers would not be predicted to provide good durability or softness properties to premium tissue products when specifically replacing wood pulp fibers. Generally, bamboo fibers have coarseness and fines that are too high to replace hardwood fibers and an average fiber length that is too short and cell walls that are too thick to replace softwood fibers.

SUMMARY

It has now been unexpectedly discovered that bamboo fibers, despite having relatively short fiber length, thick cell walls and a narrow lumen may be incorporated into a through-air dried tissue web, and particularly the non-skin contacting layer of a multi layered web, to yield a tissue web having improved bulk without a significant increase in stiffness or decrease in durability. These properties are particularly acute when bamboo fibers are substituted for high average fiber length wood fibers, such as softwood fibers and more specifically Northern Softwood Kraft (NSWK). Accordingly, in certain preferred embodiments, bamboo fibers may replace at least about 50 percent of the NSWK in the web and more preferably at least about 75 percent of the NWSK, such that bamboo fiber comprises at least about 10 percent and more preferably at least about 20 percent by weight of the web. Moreover, it has been discovered that softness levels may be further improved by disposing the bamboo fibers within the fibrous tissue web such that the bamboo fibers are not brought into contact with a user's skin in-use, such as in the middle layer of a three layered structure. Furthermore, it has been discovered that through-air dried webs comprising bamboo fibers have an unexpected increase in bulk. The improved durability and bulk are observed for several species of bamboo, including both tropical and temperate timber bamboo.

Accordingly, the present disclosure provides, in one embodiment, a through-air dried tissue web comprising bamboo fiber, wherein the bamboo fiber comprises at least about 10 percent by weight of the tissue web. If desired, the bamboo pulp fibers may have an average fiber length greater than about 1 mm, such as from about 1.1 to about 2.5 mm and more preferably from about 1.2 to about 2 mm.

In another embodiment, the present disclosure provides a through-air dried tissue web comprising bamboo fiber wherein the bamboo fiber has replaced a significant portion of the long fiber, particularly NSWK fiber such that the amount of NSWK fiber in the web is less than about 20 percent of the total web such as from about 0 to about 15 percent and more preferably from about 0 to about 10 percent of the total weight of the web.

In other embodiments, the present disclosure provides a multi-layered through air dried tissue web comprising two or more layers including a first layer and a second layer, wherein a greater weight percent of bamboo fiber is present in the second layer than in the first layer. In certain preferred embodiments the first layer comprises hardwood fibers and the second layer comprises bamboo and softwood fibers, wherein the weight ratio of bamboo fiber to softwood fiber is greater than 1:1.

In still other embodiments the disclosure provides a multi-layered tissue web comprising a first fibrous layer and a second fibrous layer, wherein the first fibrous layer comprises wood fibers and the second fibrous layer comprises bamboo fiber, wherein bamboo fibers comprise from about 75 to about 100 percent by weight of the second layer.

In other embodiments the disclosure provides a through-air dried tissue product comprising bamboo fibers, wherein the bamboo fibers are selected from the group consisting of temperate running bamboos including but not limited to *Phyllostachys heterocycla pubescens, Phyllostachys nigra* variant *Henon, Phyllostachys vivax* and *Phyllostachys Bambusoides*, and mixtures thereof.

DESCRIPTION OF THE DRAWINGS

FIG. 1 is a schematic diagram of one embodiment of a process for forming an uncreped through-air dried tissue web for use in the present disclosure.

DEFINITIONS

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein, the term "Tear Index" refers to the quotient of the geometric mean tear strength (typically expressed in grams) divided by the geometric mean tensile strength (typically expressed in grams per 3 inches) multiplied by 1,000 where the geometric mean tear index is defined as the square root of the product of the machine directional tear strength and the cross directional tear strength.

$$\text{Tear Index} = \frac{\sqrt{MD\ \text{Tear} \times CD\ \text{Tear}}}{GMT} \times 1{,}000$$

While tear index may vary depending on the composition of the tissue web, as well as the basis weight of the web, webs prepared according to the present disclosure generally have a Tear Index greater than about 5, more preferably greater than about 6 and still more preferably greater than about 7 such as from about 7 to about 20.

As used herein, the term "Burst Index" refers to the quotient of the dry burst peak load (also referred to as the dry burst strength and typically expressed gram feet) divided by the geometric mean tensile strength multiplied by 10.

$$\text{Burst Index} = \frac{\text{Dry Burst Strength}}{GMT} \times 10$$

While Burst Index may vary depending on the composition of the tissue web, as well as the basis weight of the web, webs prepared according to the present disclosure generally have a burst index greater than 3, more preferably greater than about 4 and still more preferably greater than about 5.

As used herein, the terms "geometric mean tensile" and "GMT" refer to the square root of the product of the machine direction tensile strength and the cross-machine direction tensile strength of the web. As used herein, tensile strength refers to geometric mean tensile strength as would be apparent to one skilled in the art unless otherwise stated.

As used herein, the terms "geometric mean tensile energy index" and "TEA Index" refer to the square root of the product of the MD and CD tensile energy absorption ("MD TEA" and "CD TEA," typically expressed in g·cm/cm$^2$) divided by the GMT strength multiplied by 1,000.

$$\text{TEA Index} = \frac{\sqrt{MD\ TEA \times CD\ TEA}}{GMT} \times 1{,}000$$

While the TEA Index may vary depending on the composition of the tissue web, as well as the basis weight of the web, webs prepared according to the present disclosure generally have a TEA Index greater than about 6, more preferably greater than about 7 and still more preferably greater than about 8, such as from about 8 to about 20.

As used herein, the term "Durability Index" refers to the sum of the tear index, burst index and TEA Index and is an indication of the durability of the product at a given tensile strength.

Durability Index=Tear Index+Burst Index+TEA Index

While the Durability Index may vary depending on the composition of the tissue web, as well as the basis weight of the web, webs prepared according to the present disclosure generally have a Durability Index values of about 15 or greater, more preferably about 18 or greater and still more preferably about 20 or greater such as from about 20 to about 50.

As used herein, the term "Stiffness Index" refers to the quotient of the geometric mean tensile slope, defined as the square root of the product of the MD and CD tensile slopes, divided by the geometric mean tensile strength.

$$\text{Stiffness Index} = \frac{\sqrt{MD\ \text{Tensile Slope} \times CD\ \text{Tensile Slope}}}{GMT} \times 1{,}000$$

While the Stiffness Index may vary depending on the composition of the tissue web, as well as the basis weight of the web, webs prepared according to the present disclosure generally have a Stiffness Index values of less than about 16, more preferably less than about 15 and still more preferably less than about 14 such as from about 5 to about 14.

As used herein, the term "average fiber length" refers to the length weighted average length of fibers determined utilizing a Kajaani fiber analyzer model No. FS-100 available from Kajaani Oy Electronics, Kajaani, Finland. According to the test procedure, a pulp sample is treated with a macerating liquid to ensure that no fiber bundles or shives are present. Each pulp sample is disintegrated into hot water and diluted to an approximately 0.001 percent solution. Individual test samples are drawn in approximately 50 to 100 ml portions from the dilute solution when tested using the standard Kajaani fiber analysis test procedure. The weighted average fiber length may be expressed by the following equation:

$$\sum_{x_i=0}^{k} (x_i \times n_i)/n$$

where k=maximum fiber length
$x_i$=fiber length
$n_i$=number of fibers having length $x_i$
n=total number of fibers measured.

As used herein, a "tissue product" generally refers to various paper products, such as facial tissue, bath tissue, paper towels, napkins, and the like. Normally, the basis weight of a tissue product of the present invention is less than about 80 grams per square meter (gsm), in some embodiments less than about 60 gsm, and in some embodiments, between about 10 to about 60 gsm.

Tissue products are further differentiated from other paper products in terms of their bulk. The bulk of the tissue and towel products of the present invention is calculated as the quotient of the caliper (hereinafter defined), expressed in microns, divided by the basis weight, expressed in grams per square meter. The resulting bulk is expressed as cubic centimeters per gram. In certain embodiments tissue products may have a bulk greater than about 5 cm$^3$/g and still more preferably greater than about 7 cm$^3$/g, such as from about 7 to about 15 cm$^3$/g. Tissue webs prepared according to the present disclosure may have higher bulk than the tissue products incorporating the same webs. For example, tissue webs may have a bulk greater than about 7 cm$^3$/g, such as greater than about 10 cm$^3$/g, such as from about 12 to about 24 cm$^3$/g.

As used herein, the term "layer" refers to a plurality of strata of fibers, chemical treatments, or the like within a ply.

As used herein, the terms "layered tissue web," "multi-layered tissue web," "multi-layered web," and "multi-layered paper sheet," generally refer to sheets of paper prepared from two or more layers of aqueous papermaking furnish which are preferably comprised of different fiber types. The layers are preferably formed from the deposition of separate streams of dilute fiber slurries, upon one or more endless foraminous screens. If the individual layers are initially formed on separate foraminous screens, the layers are subsequently combined (while wet) to form a layered composite web.

The term "ply" refers to a discrete product element. Individual plies may be arranged in juxtaposition to each other. The term may refer to a plurality of web-like components such as in a multi-ply facial tissue, bath tissue, paper towel, wipe, or napkin.

DETAILED DESCRIPTION

In general, the present disclosure relates to a through-air dried tissue product comprising a tissue web that has been formed from wood and bamboo fibers. It has been discovered that by replacing some of the wood fibers with bamboo fibers that a bulkier and more durable web may be produced without sacrificing softness.

Table 1 compares hardwood (*Eucalyptus* pulp fiber, Aracruz Cellulose, Brazil) softwood (NSWK pulp fiber, Northern Pulp, Canada) and kraft pulps prepared from three different bamboo species, *Phyllostachys edulis, Bambusa vulgaris* and *Phyllostachys nigra* variant *Henon*.

TABLE 1

| Fiber Type | Average Fiber Length (mm) | Average Fiber Width (μm) | Fiber Length: Fiber Width | Coarseness (mg/100 m) |
|---|---|---|---|---|
| *Phyllostachys edulis* | 1.23 | 8.4 | 146 | 10.53 |
| *Bambusa vulgaris* | 2.09 | 10.9 | 192 | 10.37 |
| *Phyllostachys nigra* variant Henon | 1.65 | 9.0 | 184 | 10.85 |
| NSWK Pulp Fiber | 2.18 | 27.6 | 79 | 14.83 |
| *Eucalyptus* Pulp Fiber | 0.76 | 19.1 | 40 | 8.95 |

For bamboo pulp fibers, the ratio of length to width (commonly referred to as the "aspect ratio") generally varies between about 150 and about 200, although both length and width vary amongst species. Generally average fiber lengths for bamboo pulp fibers range from about 2 mm for *B. vlgaris* to about 1.2 mm for *Phyllostachys edulis*. As shown in Table 1, bamboo pulp fibers are generally greater in length than *Eucalyptus* fibers, but shorter than NSWK fibers. However, bamboo pulp fibers tend to have greater aspect ratios and higher coarseness than *Eucalyptus* fibers. Additionally, bamboo pulp fibers tend to have relatively slender lumens and thick cell walls, yielding Runkel Ratios (ratio of twice the cell wall thickness to the diameter of the lumen) greater than 1. For example, the reported Runkel Ratios for *Phyllostachys nigra* variant *Henon* and *Bambusa vulgaris* are 2.17 and 3.20 respectively. Fibers having Runkel Ratios greater than 1 are commonly considered poor candidates for use in tissue because the thick cell walls produce stiff webs having poor tensile strength and low bulk.

Despite the tendency of bamboo pulp fibers to have relatively thicker cell walls, higher Runkel Ratios, higher aspect ratios and shorter average fiber lengths compared to softwood fibers it has now been surprisingly discovered that they may replace softwood fibers in a through-air dried tissue web without decreasing durability and bulk or increasing stiffness. Even more surprising is that substitution of bamboo fibers for softwood fibers actually increases bulk without negatively affecting durability and stiffness.

Accordingly, in a preferred embodiment the disclosure provides a tissue web and more preferably a through-air dried tissue web and still more preferably a multi-layered through-air dried web comprising bamboo, wherein the bamboo fibers comprise at least about 10 percent of the total weight of the web. In a particularly preferred embodiment, the tissue web comprises a multi-layered through-air dried web wherein bamboo fiber is selectively disposed in only one of the layers such that the bamboo fiber is not brought into contact with the user's skin in-use. For example, in one embodiment the tissue web may comprise a two layered web wherein the first layer consists essentially of wood fibers and is substantially free of bamboo fibers and the second layer comprises bamboo fibers, wherein the bamboo fibers comprises at least about 50 percent by weight of the second layer, such as from about 50 to about 100 percent by weight of the second layer. It should be understood that, when referring to a layer that is substantially free of bamboo fibers, negligible amounts of the fibers may be present therein, however, such small amounts often arise from the bamboo fibers applied to an adjacent layer, and do not typically substantially affect the softness or other physical characteristics of the web.

The tissue webs may be incorporated into tissue products that may be either single or multi-ply, where one or more of the plies may be formed by a multi-layered tissue web having bamboo fibers selectively incorporated in one of its layers. A particularly preferred embodiment tissue product is constructed such that the bamboo fibers are not brought into contact with the user's skin in-use. For example, the tissue product may comprise two multi-layered through-air dried webs wherein each web comprises a first fibrous layer substantially free from bamboo and a second fibrous layer comprising bamboo. The webs are plied together such that the outer surface of the tissue product is formed from the first fibrous layers of each web, such that the surface brought into contact with the user's skin in-use is substantially free of bamboo fibers.

Generally, the bamboo fibers incorporated in the webs of the present disclosure are fibrous materials derived from any bamboo species. The bamboo fiber species may be selected from the group consisting of *Acidosasa* sp., *Ampleocalamus* sp., *Arundinaria* sp., *Bambusa* sp., *Bashania* sp., *Borinda* sp., *Brachystachyum* sp., *Cephalostachyum* sp., *Chimonobambusa* sp., *Chusquea* sp., *Dendrocalamus* sp., *Dinochloa* sp., *Drepanostachyum* sp., *Eremitis* sp., *Fargesia* sp., *Gaoligongshania* sp., *Gelidocalamus* sp., *Gigantocloa* sp., *Guadua* sp., *Hibanobambusa* sp., *Himalayacalamus* sp., *Indocalamus* sp., *Indosasa* sp., *Lithachne* sp., *Melocanna* sp., *Menstruocalamus* sp., *Nastus* sp., *Neohouzeaua* sp., *Neomicrocalamus* sp., *Ochlandra* sp., *Oligostachyum* sp., *Olmeca* sp., *Otatea* sp., *Oxytenanthera* sp., *Phyllostachys* sp., *Pleioblastus* sp., *Pseudosasa* sp., *Raddia* sp., *Rhipidocladum* sp., *Sasa* sp., *Sasaella* sp., *Sasamorpha* sp., *Schizostachyum* sp., *Semiarundinaria* sp., *Shibatea* sp., *Sinobambusa* sp., *Thamnocalamus* sp., *Thyrsostachys* sp., *Yushania* sp. and mixtures thereof.

In some embodiments, the bamboo fiber is from temperate bamboos of the *Phyllostachys* species, for example *Phyllostachys heterocycla pubescens*, also known as Moso Bamboo. However, it is to be understood that the compositions disclosed herein are not limited to containing any one bamboo fiber and may comprise a plurality of fibers of different species. For example, the composition may comprise a bamboo from a *Phyllostachys heterocycla pubescens* and a bamboo from a different species such as, for example, *Phyllostachys bambusoides*.

Bamboo fiber for use in the webs and products of the present disclosure may be produced by any appropriate methods known in the art. Preferably the bamboo fibers are pulped bamboo fibers, produced by chemical processing of crushed bamboo stalk. The chemical processing may comprise treating the crushed bamboo stalk with an appropriate alkaline solution. The skilled artisan will be capable of selecting an appropriate alkaline solution. Bamboo fiber may also be produced by mechanical processing of crushed bamboo stalk, which may involve enzymatic digestion of the crushed bamboo stalk.

Although bamboo fiber may be produced by any appropriate methods known in the art, the preferred method for manufacturing the bamboo pulp is as a chemical pulping method such as, but not limited to, kraft, sulfite or soda/AQ pulping techniques.

Preferably the bamboo fibers are bamboo pulp fibers and have an average fiber length of at least about 1 mm. When blends of fibers from various bamboo species are employed, it is noted that blends may comprise two or more species of bamboo, preferably three or more, such that the average fiber length is at least about 1.2 mm and more preferably at least about 1.5 mm, such as from about 1.2 to about 2 mm.

Regardless of the species or particular average fiber length, at least one layer of a multi-layered web comprises bamboo fiber. The multi-layered web may also contain wood fibers and may be layered such that one layer comprises wood fibers, which optionally is substantially free from bamboo fibers, while another layer comprises wood and bamboo fibers. The wood fibers may include fibers formed by a variety of pulping processes, such as kraft pulp, sulfite pulp, thermomechanical pulp, and the like. Further, the wood fibers may be any high-average fiber length wood pulp, low-average fiber length wood pulp, or mixtures of the same. One example of suitable high-average length wood pulp fibers include softwood fibers such as, but not limited to, northern softwood, southern softwood, redwood, red cedar, hemlock, pine (e.g., southern pines), spruce (e.g., black spruce), combinations thereof, and the like. One example of suitable low-average length wood pulp fibers include hardwood fibers, such as, but not limited to, *eucalyptus*, maple, birch, aspen, and the like. In certain instances, *eucalyptus* fibers may be particularly desired to increase the softness of the web. *Eucalyptus* fibers can also enhance the brightness, increase the opacity, and change the pore structure of the web to increase its wicking ability. Moreover, if desired, secondary fibers obtained from recycled materials may be used, such as fiber pulp from sources such as, for example, newsprint, reclaimed paperboard, and office waste.

In a particularly preferred embodiment bamboo fibers are utilized in the tissue web as a replacement for high average fiber length wood fibers such as softwood fibers and more specifically NSWK. In one particular embodiment, the bamboo fibers are derived from *Phyllostachys pubescens* and replace NSWK such that the total amount of NSWK, by weight of the web, is less than about 10 percent. In other embodiments it may be desirable to replace all of the wood fiber in a given layer such that the layer consists essentially of bamboo fiber.

In certain embodiments it may be desirable to have particular combinations of bamboo and wood pulp fibers within a given layer to provide desired characteristics. For example, it may be desirable to combine bamboo and wood fibers having different average fiber lengths, coarseness, cell wall thickness, or other characteristics, in certain layers.

Just as the amount of bamboo within any given layer may be varied, the ratio of bamboo fibers to total fiber in the web may generally vary depending on the desired properties of the tissue product. For instance, the use of a thicker bamboo layer typically results in a tissue product with higher durability but lower softness. Additionally, the use of a large amount of bamboo fibers may negatively impact sheet formation and may increase the cost of manufacture. Likewise, the use of very low amounts of bamboo fibers, i.e., less than about 10 percent of the total weight of the web, typically results in a tissue product having little discernable difference compared to tissue products manufactured without bamboo. Thus, in certain embodiments, tissue webs prepared according to the present disclosure comprise bamboo fibers in an amount from about 10 to about 80 percent by weight of the web, preferably from about from about 15 to about 60 percent and more preferably from about 25 to about 50 percent.

As noted previously, in a preferred embodiment bamboo fibers are introduced to the web as a replacement for softwood fibers, accordingly in such preferred embodiments the amount of softwood fibers in the web may range from about 0 to about 20 percent by weight of the total web, more preferably from 0 to about 10 percent and most preferably less than about 5 percent by weight of the total web. In one preferred embodiment the amount of softwood fiber in the web is less than 1 percent by weight of the total web.

In addition to varying the amount of bamboo within the web, as well as the amount in any given layer, the physical properties of the web may be varied by specifically selecting particular layer(s) for incorporation of the bamboo fibers. It has now been discovered that the greatest increase in softness without adverse effects on tensile strength or other sheet properties is achieved by selectively incorporating the bamboo fibers in a multi-layered web such that the layer comprising bamboo is not brought into contact with the user's skin in-use. Further, if desired, the increase in cost often encountered with bamboo fibers can be reduced by restricting application of the bamboo fibers to only a single layer of the web. For instance, in one embodiment, a three-layered tissue web can be formed in which only the middle layer contains bamboo fibers, while the outer layers are substantially free of bamboo fibers.

Accordingly, in a preferred embodiment the tissue web is a multi-layered web comprising a first fibrous layer and a second fibrous layer, wherein the first fibrous layer comprises wood fibers and the second fibrous layer comprises bamboo fibers, wherein the amount of bamboo fibers is from about 50 to about 100 percent by weight of the second layer. In certain embodiments the second fibrous layer may comprise a blend of wood and bamboo fibers, and more preferably a blend of bamboo and softwood fibers wherein the amount of bamboo fibers is from about 50 to about 90 percent by weight of the second layer and still more preferably from about 80 to about 95 percent by weight of the second layer. In a particularly preferred embodiment the first fibrous layer comprises hardwood fiber.

In other embodiments the present disclosure provides a two-ply tissue product. In a particularly preferred embodiment, the tissue product contains an upper multi-layered tissue web and a lower multi-layered tissue web that are plied together using well-known techniques. The multi-layered webs comprise at least a first and a second layer, wherein bamboo fibers are selectively incorporated in only one of the layers, such that when the webs are plied together the layers containing the bamboo fibers are not brought into contact with the user's skin in-use. For example, the two-ply tissue product may comprise a first and second tissue web, wherein the tissue webs each comprise a first and second layer. The first layer of each tissue web comprises wood fibers and is substantially free of bamboo fibers, while the second layer of each tissue web comprises bamboo fibers. When the tissue webs are plied together to form the tissue product the second layers of each web are arranged in a facing relationship such that the bamboo fibers are not brought into contact with the user's skin in-use.

If desired, various chemical compositions may be applied to one or more layers of the multi-layered tissue web to further enhance softness and/or reduce the generation of lint or slough. For example, in some embodiments, a wet strength agent can be utilized, to further increase the strength of the tissue product. As used herein, a "wet strength agent" is any material that, when added to pulp fibers can provide a resulting web or sheet with a wet geometric tensile strength to dry geometric tensile strength ratio in excess of about 0.1. Typically these materials are termed either "permanent" wet strength agents or "temporary" wet strength agents. As is well known in the art, temporary and permanent wet strength agents may also sometimes function as dry strength agents to enhance the strength of the tissue product when dry.

Wet strength agents may be applied in various amounts, depending on the desired characteristics of the web. For instance, in some embodiments, the total amount of wet strength agents added can be between about 1 to about 60 pound per ton (lb/T), in some embodiments, between about 5 to about 30 lb/T, and in some embodiments, between about 7 to about 13 lb/T of the dry weight of fibrous material. The wet strength agents can be incorporated into any layer of the multi-layered tissue web.

A chemical debonder can also be applied to soften the web. Specifically, a chemical debonder can reduce the amount of hydrogen bonds within one or more layers of the web, which results in a softer product. Depending on the desired characteristics of the resulting tissue product, the debonder can be utilized in varying amounts. For example, in some embodiments, the debonder can be applied in an amount between about 1 to about 30 lb/T, in some embodiments between about 3 to about 20 lb/T, and in some embodiments, between about 6 to about 15 lb/T of the dry weight of fibrous material. The debonder can be incorporated into any layer of the multi-layered tissue web.

Any material capable of enhancing the soft feel of a web by disrupting hydrogen bonding can generally be used as a debonder in the present invention. In particular, as stated above, it is typically desired that the debonder possess a cationic charge for forming an electrostatic bond with anionic groups present on the pulp. Some examples of suitable cationic debonders can include, but are not limited to, quaternary ammonium compounds, imidazolinium compounds, bis-imidazolinium compounds, diquaternary ammonium compounds, polyquaternary ammonium compounds, ester-functional quaternary ammonium compounds (e.g., quaternized fatty acid trialkanolamine ester salts), phospholipid derivatives, polydimethylsiloxanes and related cationic and non-ionic silicone compounds, fatty and carboxylic acid derivatives, mono and polysaccharide derivatives, polyhydroxy hydrocarbons, etc. For instance, some suitable debonders are described in U.S. Pat. Nos. 5,716,498, 5,730,839, 6,211,139, 5,543,067, and WO/0021918, all which are incorporated herein in a manner consistent with the present disclosure.

Still other suitable debonders are disclosed in U.S. Pat. Nos. 5,529,665 and 5,558,873, both of which are incorporated herein in a manner consistent with the present disclosure. In particular, U.S. Pat. No. 5,529,665 discloses the use of various cationic silicone compositions as softening agents.

Tissue webs of the present disclosure can generally be formed by any of a variety of papermaking processes known in the art. Preferably the tissue web is formed by through-air drying and be either creped or uncreped. For example, a papermaking process of the present disclosure can utilize adhesive creping, wet creping, double creping, embossing, wet-pressing, air pressing, through-air drying, creped through-air drying, uncreped through-air drying, as well as other steps in forming the paper web. Some examples of such techniques are disclosed in U.S. Pat. Nos. 5,048,589, 5,399, 412, 5,129,988 and 5,494,554 all of which are incorporated herein in a manner consistent with the present disclosure. When forming multi-ply tissue products, the separate plies can be made from the same process or from different processes as desired.

For example, in one embodiment, tissue webs may be creped through-air dried webs formed using processes known in the art. To form such webs, an endless traveling forming fabric, suitably supported and driven by rolls, receives the layered papermaking stock issuing from headbox. A vacuum box is disposed beneath the forming fabric and is adapted to remove water from the fiber furnish to assist in forming a web. From the forming fabric, a formed web is transferred to a second fabric, which may be either a wire or a felt. The fabric is supported for movement around a continuous path by a plurality of guide rolls. A pick up roll designed to facilitate transfer of web from fabric to fabric may be included to transfer the web.

Preferably the formed web is dried by transfer to the surface of a rotatable heated dryer drum, such as a Yankee dryer. The web may be transferred to the Yankee directly from the throughdrying fabric, or preferably, transferred to an impression fabric which is then used to transfer the web to the Yankee dryer. In accordance with the present disclosure, the creping composition of the present disclosure may be applied topically to the tissue web while the web is traveling on the fabric or may be applied to the surface of the dryer drum for transfer onto one side of the tissue web. In this manner, the creping composition is used to adhere the tissue web to the dryer drum. In this embodiment, as the web is carried through a portion of the rotational path of the dryer surface, heat is imparted to the web causing most of the moisture contained within the web to be evaporated. The web is then removed from the dryer drum by a creping blade. The creping web as it is formed further reduces internal bonding within the web and increases softness. Applying the creping composition to the web during creping, on the other hand, may increase the strength of the web.

In another embodiment the formed web is transferred to the surface of the rotatable heated dryer drum, which may be a Yankee dryer. The press roll may, in one embodiment, comprise a suction pressure roll. In order to adhere the web to the surface of the dryer drum, a creping adhesive may be applied to the surface of the dryer drum by a spraying device. The spraying device may emit a creping composition made in accordance with the present disclosure or may emit a conventional creping adhesive. The web is adhered to the surface of the dryer drum and then creped from the drum using the creping blade. If desired, the dryer drum may be associated with a hood. The hood may be used to force air against or through the web.

In other embodiments, once creped from the dryer drum, the web may be adhered to a second dryer drum. The second dryer drum may comprise, for instance, a heated drum surrounded by a hood. The drum may be heated from about 25 to about 200° C., such as from about 100 to about 150° C.

In order to adhere the web to the second dryer drum, a second spray device may emit an adhesive onto the surface of the dryer drum. In accordance with the present disclosure, for instance, the second spray device may emit a creping composition as described above. The creping composition not only assists in adhering the tissue web to the dryer drum, but also is transferred to the surface of the web as the web is creped from the dryer drum by the creping blade.

Once creped from the second dryer drum, the web may, optionally, be fed around a cooling reel drum and cooled prior to being wound on a reel.

For example, once a fibrous web is formed and dried, in one aspect, the creping composition may be applied to at least one side of the web and the at least one side of the web may then be creped. In general, the creping composition may be applied to only one side of the web and only one side of the web may be creped, the creping composition may be applied to both sides of the web and only one side of the web is creped, or the creping composition may be applied to each side of the web and each side of the web may be creped.

Once creped the tissue web may be pulled through a drying station. The drying station can include any form of a heating unit, such as an oven energized by infra-red heat, microwave energy, hot air or the like. A drying station may be necessary in some applications to dry the web and/or cure the creping composition. Depending upon the creping composition selected, however, in other applications a drying station may not be needed.

In other embodiments, the base web is formed by an uncreped through-air drying process. Referring to FIG. 1, a process of carrying out using the present disclosure will be described in greater detail. The process shown depicts an uncreped throughdried process, but it will be recognized that any known papermaking method or tissue making method can be used in conjunction with the nonwoven tissue making fabrics of the present disclosure. Related uncreped through-air dried tissue processes are described for example, in U.S. Pat. Nos. 5,656,132 and 6,017,417, both of which are hereby incorporated by reference herein in a manner consistent with the present disclosure.

In FIG. 1, a twin wire former having a papermaking headbox 10 injects or deposits a furnish of an aqueous suspension of papermaking fibers onto a plurality of forming fabrics, such as the outer forming fabric 5 and the inner forming fabric 3, thereby forming a wet tissue web 6. The forming process of the present disclosure may be any conventional forming process known in the papermaking industry. Such formation processes include, but are not limited to, Fourdriniers, roof formers such as suction breast roll formers, and gap formers such as twin wire formers and crescent formers.

The wet tissue web 6 forms on the inner forming fabric 3 as the inner forming fabric 3 revolves about a forming roll 4. The inner forming fabric 3 serves to support and carry the newly-formed wet tissue web 6 downstream in the process as the wet tissue web 6 is partially dewatered to a consistency of about 10 percent based on the dry weight of the fibers. Additional dewatering of the wet tissue web 6 may be carried out by known paper making techniques, such as vacuum suction boxes, while the inner forming fabric 3 supports the wet tissue web 6. The wet tissue web 6 may be additionally dewatered to a consistency of at least about 20 percent, more specifically between about 20 to about 40 percent, and more specifically about 20 to about 30 percent.

The forming fabric 3 can generally be made from any suitable porous material, such as metal wires or polymeric filaments. For instance, some suitable fabrics can include, but are not limited to, Albany 84M and 94M available from Albany International (Albany, N.Y.) Asten 856, 866, 867, 892, 934, 939, 959, or 937; Asten Synweve Design 274, all of which are available from Asten Forming Fabrics, Inc. (Appleton, Wis.); and Voith 2164 available from Voith Fabrics (Appleton, Wis.). Forming fabrics or felts comprising nonwoven base layers may also be useful, including those of Scapa Corporation made with extruded polyurethane foam such as the Spectra Series.

The wet web 6 is then transferred from the forming fabric 3 to a transfer fabric 8 while at a solids consistency of between about 10 to about 35 percent, and particularly, between about 20 to about 30 percent. As used herein, a "transfer fabric" is a fabric that is positioned between the forming section and the drying section of the web manufacturing process.

Transfer to the transfer fabric 8 may be carried out with the assistance of positive and/or negative pressure. For example, in one embodiment, a vacuum shoe 9 can apply negative pressure such that the forming fabric 3 and the transfer fabric 8 simultaneously converge and diverge at the leading edge of the vacuum slot. Typically, the vacuum shoe 9 supplies pressure at levels between about 10 to about 25 inches of mercury. As stated above, the vacuum transfer shoe 9 (negative pressure) can be supplemented or replaced by the use of positive pressure from the opposite side of the web to blow the web onto the next fabric. In some embodiments, other vacuum shoes can also be used to assist in drawing the fibrous web 6 onto the surface of the transfer fabric 8.

Typically, the transfer fabric 8 travels at a slower speed than the forming fabric 3 to enhance the MD and CD stretch of the web, which generally refers to the stretch of a web in its cross (CD) or machine direction (MD) (expressed as percent elongation at sample failure). For example, the relative speed difference between the two fabrics can be from about 1 to about 30 percent, in some embodiments from about 5 to about 20 percent, and in some embodiments, from about 10 to about 15 percent. This is commonly referred to as "rush transfer". During "rush transfer", many of the bonds of the web are believed to be broken, thereby forcing the sheet to bend and fold into the depressions on the surface of the transfer fabric 8. Such molding to the contours of the surface of the transfer fabric 8 may increase the MD and CD stretch of the web. Rush transfer from one fabric to another can follow the principles taught in any one of the following patents, U.S. Pat. Nos. 5,667,636, 5,830,321, 4,440,597, 4,551,199, 4,849,054, all of which are hereby incorporated by reference herein in a manner consistent with the present disclosure.

The wet tissue web 6 is then transferred from the transfer fabric 8 to a throughdrying fabric 11. Typically, the transfer fabric 8 travels at approximately the same speed as the throughdrying fabric 11. However, it has now been discovered that a second rush transfer may be performed as the web is transferred from the transfer fabric 8 to a throughdrying fabric 11. This rush transfer is referred to herein as occurring at the second position and is achieved by operating the throughdrying fabric 11 at a slower speed than the transfer fabric 8. By performing rush transfer at two distinct locations, i.e., the first and the second positions, a tissue product having increased CD stretch may be produced.

In addition to rush transferring the wet tissue web from the transfer fabric 8 to the throughdrying fabric 11, the wet tissue web 6 may be macroscopically rearranged to conform to the surface of the throughdrying fabric 11 with the aid of a vacuum transfer roll 12 or a vacuum transfer shoe like the vacuum shoe 9. If desired, the throughdrying fabric 11 can be run at a speed slower than the speed of the transfer fabric 8 to further enhance MD stretch of the resulting absorbent tissue product. The transfer may be carried out with vacuum assistance to ensure conformation of the wet tissue web 6 to the topography of the throughdrying fabric 11.

While supported by the throughdrying fabric 11, the wet tissue web 6 is dried to a final consistency of about 94 percent or greater by a throughdryer 13. The web 15 then passes through the winding nip between the reel drum 22 and the reel 23 and is wound into a roll of tissue 25 for subsequent converting, such as slitting cutting, folding, and packaging.

The web is transferred to the throughdrying fabric for final drying preferably with the assistance of vacuum to ensure macroscopic rearrangement of the web to give the desired bulk and appearance. The use of separate transfer and throughdrying fabrics can offer various advantages since it allows the two fabrics to be designed specifically to address key product requirements independently. For example, the transfer fabrics are generally optimized to allow efficient conversion of high rush transfer levels to high MD stretch while throughdrying fabrics are designed to deliver bulk and CD stretch. It is therefore useful to have moderately coarse and moderately three-dimensional transfer fabrics and throughdrying fabrics which are quite coarse and three dimensional in the optimized configuration. The result is that a relatively smooth sheet leaves the transfer section and then is macroscopically rearranged (with vacuum assist) to give the high bulk, high CD stretch surface topology of the throughdrying fabric. Sheet topology is completely changed from transfer to throughdrying fabric and fibers are macroscopically rearranged, including significant fiber-fiber movement.

The drying process can be any noncompressive drying method which tends to preserve the bulk or thickness of the wet web including, without limitation, throughdrying, infrared radiation, microwave drying, etc. Because of its commercial availability and practicality, throughdrying is well known and is one commonly used means for noncompressively drying the web for purposes of this invention. Suitable throughdrying fabrics include, without limitation, fabrics with substantially continuous machine direction ridges whereby the ridges are made up of multiple warp strands grouped together, such as those disclosed in U.S. Pat. No. 6,998,024. Other suitable throughdrying fabrics include those disclosed in U.S. Pat. No. 7,611,607, which is incorporated herein in a manner consistent with the present disclosure, particularly the fabrics denoted as Fred (t1207-77), Jeston (t1207-6) and Jack (t1207-12). The web is preferably dried to final dryness on the throughdrying fabric, without being pressed against the surface of a Yankee dryer, and without subsequent creping.

Once the wet tissue web 6 has been non-compressively dried, thereby forming the dried tissue web 15, it is possible to crepe the dried tissue web 15 by transferring the dried tissue web 15 to a Yankee dryer prior to reeling, or using alternative foreshortening methods such as microcreping as disclosed in U.S. Pat. No. 4,919,877.

In the wound product, it is often advantageous to wind the product with the softest side facing the consumer, and hence the shearing process to increase the softness of this side is preferred. However, it is also possible to treat the air side of the web rather than the fabric side, and in these embodiments, it would be possible to increase the air-side softness to a level higher than that of the fabric side.

The process of the present disclosure is well suited to forming multi-ply tissue products. The multi-ply tissue products can contain two plies, three plies, or a greater number of plies. In one particular embodiment, a two-ply rolled tissue product is formed according to the present disclosure in which both plies are manufactured using the same papermaking process, such as, for example, uncreped through-air dried. However, in other embodiments, the plies may be formed by two different processes. Generally, prior to being wound in a roll, the first ply and the second ply are attached together. Any suitable manner for laminating the webs together may be used. For example, the process includes a crimping device that causes the plies to mechanically attach together through fiber entanglement. In an alternative embodiment, however, an adhesive may be used in order to attach the plies together.

Additionally, webs prepared according to the present disclosure may be subjected to any suitable post processing including, but not limited to, printing, embossing, calendaring, slitting, folding, combining with other fibrous structures, and the like.

By combining bamboo fibers in a tissue web in this manner, the disclosure provides tissue webs having surprising characteristics. For example, through-air dried tissue webs comprising bamboo have improved bulk, without a loss of durability or softness. Table 2 below shows a comparison of through-air dried and conventional wet pressed control webs comprising hardwood and softwood fibers with comparable webs wherein the softwood fiber has been replaced with either bamboo or hardwood *Eucalyptus* fiber, respectively. As shown in Table 2, the addition of bamboo to the web results in an increase in sheet bulk without negatively effecting durability or softness. However, this effect is only observed for through-air dried tissue webs. When the web is manufactured using conventional wet pressed techniques the bulk actually decreases, while durability and softness are negatively affected. Similarly, replacement of the softwood fiber with hardwood fiber, while resulting in an increase in bulk, causes a decrease in both durability and softness.

TABLE 2

| | Bamboo | | | Eucalyptus | | |
|---|---|---|---|---|---|---|
| Control | Delta Bulk | Delta Durability Index | Delta Stiffness Index | Delta Bulk | Delta Durability Index | Delta Stiffness Index |
| TAD Web | 7.7% | −0.8% | 12.7% | 7.9% | −14.8% | 30.1% |
| CWP Web | −10.9% | −20.6% | 31.4% | −7.0% | −30.5% | 30.3% |

Test Methods

Sheet Bulk

Sheet Bulk is calculated as the quotient of the dry sheet caliper expressed in microns, divided by the dry basis weight, expressed in grams per square meter. The resulting Sheet Bulk is expressed in cubic centimeters per gram. More specifically, the Sheet Bulk is the representative thickness of a single tissue sheet measured in accordance with TAPPI test methods T402 "Standard Conditioning and Testing Atmosphere For Paper, Board, Pulp Handsheets and Related Products" and T411 om-89 "Thickness (caliper) of Paper, Paperboard, and Combined Board." The micrometer used for carrying out T411 om-89 is an Emveco 200-A Tissue Caliper Tester (Emveco, Inc., Newberg, Oreg.). The micrometer has a load of 2 kilo-Pascals, a pressure foot area of 2500 square millimeters, a pressure foot diameter of 56.42 millimeters, a dwell time of 3 seconds and a lowering rate of 0.8 millimeters per second.

Tear

Tear testing was carried out in accordance with TAPPI test method T-414 "Internal Tearing Resistance of Paper (Elmendorf-type method)" using a falling pendulum instrument such as Lorentzen & Wettre Model SE 009. Tear strength is directional and MD and CD tear are measured independently.

More particularly, a rectangular test specimen of the sample to be tested is cut out of the tissue product or tissue basesheet such that the test specimen measures 63 mm±0.15 mm (2.5 inches±0.006") in the direction to be tested (such as the MD or CD direction) and between 73 and 114 millimeters (2.9 and 4.6 inches) in the other direction. The specimen edges must be cut parallel and perpendicular to the testing direction (not skewed). Any suitable cutting device, capable of the proscribed precision and accuracy, can be used. The test specimen should be taken from areas of the sample that are free of folds, wrinkles, crimp lines, perforations or any other distortions that would make the test specimen abnormal from the rest of the material.

The number of plies or sheets to test is determined based on the number of plies or sheets required for the test results to fall between 20 to 80 percent on the linear range scale of the tear tester and more preferably between 20 to 60 percent of the linear range scale of the tear tester. The sample preferably should be cut no closer than 6 mm (0.25 inch) from the edge of the material from which the specimens will be cut. When testing requires more than one sheet or ply the sheets are placed facing in the same direction.

The test specimen is then placed between the clamps of the falling pendulum apparatus with the edge of the specimen aligned with the front edge of the clamp. The clamps are closed and a 20-millimeter slit is cut into the leading edge of the specimen usually by a cutting knife attached to the instrument. For example, on the Lorentzen & Wettre Model SE 009 the slit is created by pushing down on the cutting knife lever until it reaches its stop. The slit should be clean with no tears or nicks as this slit will serve to start the tear during the subsequent test.

The pendulum is released and the tear value, which is the force required to completely tear the test specimen, is recorded. The test is repeated a total of ten times for each sample and the average of the ten readings reported as the tear strength. Tear strength is reported in units of grams of force (gf). The average tear value is the tear strength for the direction (MD or CD) tested. The "geometric mean tear strength" is the square root of the product of the average MD tear strength and the average CD tear strength. The Lorentzen & Wettre Model SE 009 has a setting for the number of plies tested. Some testers may need to have the reported tear strength multiplied by a factor to give a per ply tear strength. For basesheets intended to be multiple ply products, the tear results are reported as the tear of the multiple ply product and not the single ply basesheet. This is done by multiplying the single ply basesheet tear value by the number of plies in the finished product. Similarly, multiple ply finished product data for tear is presented as the tear strength for the finished product sheet and not the individual plies. A variety of means can be used to calculate but in general will be done by inputting the number of sheets to be tested rather than number of plies to be tested into the measuring device. For example, two sheets would be two 1-ply sheets for 1-ply product and two 2-ply sheets (4-plies) for 2-ply products.

Tensile

Tensile testing was done in accordance with TAPPI test method T-576 "Tensile properties of towel and tissue products (using constant rate of elongation)" wherein the testing is conducted on a tensile testing machine maintaining a constant rate of elongation and the width of each specimen tested is 3 inches. More specifically, samples for dry tensile strength testing were prepared by cutting a 3 inches±0.05" (76.2 mm±1.3 mm) wide strip in either the machine direction (MD) or cross-machine direction (CD) orientation using a JDC Precision Sample Cutter (Thwing-Albert Instrument Company, Philadelphia, Pa., Model No. JDC 3-10, Serial No. 37333) or equivalent. The instrument used for measuring tensile strengths was an MTS Systems Sintech 11S, Serial No. 6233. The data acquisition software was an MTS TestWorks® for Windows Ver. 3.10 (MTS Systems Corp., Research Triangle Park, N.C.). The load cell was selected from either a 50 Newton or 100 Newton maximum, depending on the strength of the sample being tested, such that the majority of peak load values fall between 10 to 90 percent of the load cell's full scale value. The gauge length between jaws was 4±0.04 inches (101.6±1 mm) for facial tissue and towels and 2±0.02 inches (50.8±0.5 mm) for bath tissue. The crosshead speed was 10±0.4 inches/min (254±1 mm/min), and the break sensitivity was set at 65 percent. The sample was placed in the jaws of the instrument, centered both vertically and horizontally. The test was then started and ended when the specimen broke. The peak load was recorded as either the "MD tensile strength" or the "CD tensile strength" of the specimen depending on direction of the sample being tested. Ten representative specimens were tested for each product or sheet and the arithmetic average of all individual specimen tests was recorded as the appropriate MD or CD tensile strength the product or sheet in units of grams of force per 3 inches of sample. The geometric mean tensile (GMT) strength was calculated and is expressed as grams-force per 3 inches of sample width. Tensile energy absorbed (TEA) and slope are also calculated by the tensile tester. TEA is reported in units of gm cm/cm$^2$. Slope is recorded in units of kg. Both TEA and Slope are directional dependent and thus MD and CD directions are measured independently. Geometric mean TEA and geometric mean slope are defined as the square root of the product of the representative MD and CD values for the given property.

Multi-ply products were tested as multi-ply products and results represent the tensile strength of the total product. For example, a 2-ply product was tested as a 2-ply product and recorded as such. A basesheet intended to be used for a two ply product was tested as two plies and the tensile recorded as such. Alternatively, a single ply may be tested and the result multiplied by the number of plies in the final product to get the tensile strength.

Burst Strength

Burst strength herein is a measure of the ability of a fibrous structure to absorb energy, when subjected to deformation normal to the plane of the fibrous structure. Burst strength may be measured in general accordance with ASTM D-6548 with the exception that the testing is done on a Constant-Rate-of-Extension (MTS Systems Corporation, Eden Prairie, Minn.) tensile tester with a computer-based data acquisition and frame control system, where the load cell is positioned above the specimen clamp such that the penetration member is lowered into the test specimen causing it to rupture. The arrangement of the load cell and the specimen is opposite that illustrated in FIG. 1 of ASTM D-6548. The penetration assembly consists of a semi spherical anodized aluminum penetration member having a diameter of 1.588±0.005 cm affixed to an adjustable rod having a ball end socket. The test specimen is secured in a specimen clamp consisting of upper and lower concentric rings of aluminum between which the sample is held firmly by mechanical clamping during testing. The specimen clamping rings has an internal diameter of 8.89±0.03 cm.

The tensile tester is set up such that the crosshead speed is 15.2 cm/min, the probe separation is 104 mm, the break sensitivity is 60 percent and the slack compensation is 10 gf and the instrument is calibrated according to the manufacturer's instructions.

Samples are conditioned under TAPPI conditions and cut into 127×127 mm±5 mm squares. For each test a total of 3 sheets of product are combined. The sheets are stacked on top of one another in a manner such that the machine direction of the sheets is aligned. Where samples comprise multiple plies, the plies are not separated for testing. In each instance the test sample comprises 3 sheets of product. For example, if the product is a 2-ply tissue product, 3 sheets of product, totaling 6 plies are tested. If the product is a single ply tissue product, then 3 sheets of product totaling 3 plies are tested.

Prior to testing the height of the probe is adjusted as necessary by inserting the burst fixture into the bottom of the tensile tester and lowering the probe until it was positioned approximately 12.7 mm above the alignment plate. The length of the probe is then adjusted until it rests in the recessed area of the alignment plate when lowered.

It is recommended to use a load cell in which the majority of the peak load results fall between 10 and 90% of the capacity of the load cell. To determine the most appropriate load cell for testing, samples are initially tested to determine peak load. If peak load is <450 gf a 10 Newton load cell is used, if peak load is >450 gf a 50 Newton load cell is used.

Once the apparatus is set-up and a load cell selected, samples are tested by inserting the sample into the specimen clamp and clamping the test sample in place. The test sequence is then activated, causing the penetration assembly to be lowered at the rate and distance specified above. Upon rupture of the test specimen by the penetration assembly the measured resistance to penetration force is displayed and recorded. The specimen clamp is then released to remove the sample and ready the apparatus for the next test.

The peak load (gf) and energy to peak (g-cm) are recorded and the process repeated for all remaining specimens. A minimum of five specimens are tested per sample and the peak load average of five tests is reported as the Dry Burst Strength.

EXAMPLES

Example 1

Conventional Wet Pressed Tissue Comprising Bamboo

Sample codes were made using a wet pressed process utilizing a Crescent Former. Accordingly, single ply bath and two ply facial tissue products were produced and tested according to the same tests described in the Test Methods section. The following tissue manufacturing process was used to produce the sample codes.

Initially, northern softwood kraft ("NSWK") pulp was dispersed in a pulper for 30 minutes at 3 percent consistency at about 100° F. In certain instances, as indicated in the tables below, NSWK pulp was refined at 1.5 to 5.0 hp-days/metric ton. The NSWK pulp was then transferred to a dump chest and subsequently diluted to approximately 0.75 percent consistency. Once diluted, in certain instances Kymene® 920A and/or Hercobond® 1366 (both available from Ashland, Covington, Ky.) was added to the NSWK. When utilized in a multi-layered tissue web, NSWK fibers were added to the middle layer of the 3-layered tissue web.

Aracruz ECF, a eucalyptus hardwood kraft ("EHWK") pulp (Aracruz, Rio de Janeiro, RJ, Brazil) was dispersed in a pulper for 30 minutes at about 3 percent consistency at about 100° F. The EHWK pulp was then transferred to a dump chest and subsequently diluted to about 0.75 percent consistency. The EHWK pulp fibers were used in the two outer layers of the 3-layered tissue structure.

Commercial bleached bamboo pulps were obtained from Guizhou Chitianhua Paper Co., Ltd., Guizhou, China (herein after "Chinese Bamboo") and Phoenix Pulp and Paper PCL, Khon-Kaen, Thailand (hereinafter "Thai Bamboo"). The Chinese Bamboo was a mixture of 3 species of tropical bamboo *Neosinocalamus affinis*, *Bambusa rigida*, and *Bambusa pervariabilis×Dendrocalamopsis Daii*. The Chinese Bamboo was pulped by a TCF sulfate process. The Thai Bamboo was an ECF Bleached Kraft pulp consisting of a mixture of four tropical bamboo species: *Bambusa Bluemeana, Bambusa Tulda, Bambusa Nana* and *Dendrocalmus Asper*.

Moso Bamboo pulp fibers were prepared from chipped green Moso bamboo poles by a Kraft pulp process using $Na_2S$ and NaOH for digestion followed by oxygen delignification and bleaching with chlorine dioxide. After bleaching the pulp was dried to 30 to 50 percent consistency on a belt press to form a never dried crumb pulp. Never dried pulp was converted to dry lap pulp having a basis weight of around 250 $g/m^2$ by slurrying 350 oven dried basis pounds of bamboo crumb pulp in 1400 gallons of water in a hydrapulper at about 125° F. The slurry was pulped for about 20 minutes to give 3 percent consistency bamboo pulp slurry. The slurry was passed to a headbox and deposited on a Fourdinier forming belt moving at about 90 feet per minute and dewatered. Minimal pressing was done in the water removal process using only the roll weights in the wet press section of the machine. The dewatered pulp sheet was then passed over three stacks of calendar dryers, dried and rolled on 4-inch cores. Steam pressures in the calendar stacks were controlled to provide a dry lap pulp having between 6 and 8 percent moisture.

Bamboo or NSWK pulp fibers were dispersed in a pulper for 25 minutes at 3 percent consistency at about 100° F. In certain instances, as indicated in the tables below, the bamboo pulp was refined at 1.5 to 5.0 hp-days/metric ton. The bamboo or NSWK pulp was then transferred to a dump chest and subsequently diluted to approximately 0.75 percent consistency. Once diluted, in certain instances Kymene® 920A and/or Hercobond® 1366 were added to the NSWK. When utilized in a multi-layered tissue web, bamboo and NSWK fibers were added to the middle layer of the 3-layered tissue web.

Similarly Bleached *Eucalyptus* Hardwood Kraft pulp fibers obtained from Fibria, S.A., were dispersed in a pulper for 25 minutes at 3 percent consistency at 100° F. The *Eucalyptus* pulp slurry was then transferred to a dump chest and subsequently diluted to approximately 0.75 percent consistency. Once diluted, in certain instances Kymene® 920A, Hercobond® 1366, were added to the NSWK. When utilized in a multi-layered tissue web, bamboo and NSWK fibers were added to the middle layer of the 3-layered tissue web.

In certain instances the pulp fibers from the machine chests were pumped to the headbox at a consistency of about 0.1 percent. Pulp fibers from each machine chest were sent through separate manifolds in the headbox to create a 3-layered tissue structure. The flow rates of the stock pulp fiber slurries into the flow spreader were adjusted to give a target web basis. In those instances where a layer structure was produced, flow of stock pulp fiber slurries was controlled to provide a layer split of about 30 to about 35 percent by total weight of the tissue web EHWK fibers on both outer layers and 30 to about 40 percent NSWK or bamboo pulp fibers in the center layer. The fibers were deposited onto a felt in using a Crescent Former.

In other instances a blended web was produced by weighing out the appropriate amount of the first pulp fiber into the pulper and dispersing for 30 minutes at 3 percent consistency at about 100° F. In some instances the pulp was refined at 1.5 to 5.0 hp-days/metric ton. The first pulp slurry was then transferred equally to three dump chests. The amount of the second pulp fiber was then weighed into the pulper and dispersed and refined in similar fashion if so required. The second pulp slurry was then transferred equally to the three dump chests. The three dump chests now contained a blended mix of the fibers. The dump chests were subsequently diluted to approximately 0.75 percent consistency. Once diluted, in certain instances Kymene® 920A and/or Hercobond® 1366 were added to the blended furnishes in the dump chests. The blended slurries were then diluted to approximately 0.1 percent consistency before being pumped to a 3-layer headbox such that all 3-layer splits were evenly distributed. Alternatively, when no refining was required, the pulps could be blended together in the pulper per the procedure proscribed and then the blended slurry transferred from the pulper to the machine chests.

The wet sheet, about 10 to 20 percent consistency, was adhered to a Yankee dryer, traveling at about 80 to 120 fpm through a nip via a pressure roll.

The consistency of the wet sheet after the pressure roll nip (post-pressure roll consistency or PPRC) was approximately 40 percent. A spray boom situated underneath the Yankee dryer sprayed a creping composition at a pressure of 60 psi at a rate of approximately 0.25 g solids/m$^2$ of product. The creping composition comprised 0.16 percent by weight of polyvinyl alcohol (PVOH), (Celvol™ 523 available from Celanese Chemicals, Calvert City, Ky.), 0.013 percent by weight PAE resin (Kymene™ 6500 available from Ashland, Covington, Ky.) and 0.0013 percent by weight of Resozol™ 2008 (Ashland, Covington, Ky.).

The sheet was dried to about 98 to 99 percent consistency as it traveled on the Yankee dryer and to the creping blade. The creping blade subsequently scraped the tissue sheet and a portion of the creping composition off the Yankee dryer. The creped tissue basesheet was then wound onto a core traveling at about 50 to about 100 fpm into soft rolls for converting.

To produce the 2-ply facial tissue products (Sample Nos. 1-4), two soft rolls of the creped tissue were then rewound, calendared, and plied together so that both creped sides were on the outside of the 2-ply structure. Mechanical crimping on the edges of the structure held the plies together. The plied sheet was then slit on the edges to a standard width of approximately 8.5 inches and folded, and cut to facial tissue length. Tissue samples were conditioned and tested.

Samples produced according to the present example are summarized in Table 3, below.

TABLE 3

| Sample | Single Ply Basis Weight (gsm) | Web Structure | Plies | NSWK (wt %) | EHWK (wt %) | Bamboo (wt %) |
|---|---|---|---|---|---|---|
| 1 | 15.1 | Layered | 2 | 30 | 70 | 0 |
| 2 | 15.1 | Layered | 2 | 40 | 60 | 0 |
| 3 | 15.1 | Layered | 2 | 0 | 70 | 30 |
| 4 | 15.1 | Layered | 2 | 0 | 60 | 40 |
| 5 | 16.7 | Blended | 1 | 40 | 60 | 0 |
| 6 | 16.7 | Blended | 1 | 40 | 60 | 0 |
| 7 | 16.7 | Blended | 1 | 0 | 100 | 0 |
| 8 | 16.7 | Blended | 1 | 0 | 100 | 0 |
| 9 | 16.7 | Blended | 1 | 0 | 60 | 40 |
| 10 | 16.7 | Blended | 1 | 0 | 60 | 40 |

Example 2

Uncreped Through-air Dried Tissue Comprising Bamboo

A single ply through-air dried tissue web was made generally in accordance with U.S. Pat. No. 5,607,551, which is herein incorporated by reference in a manner consistent with the present disclosure.

More specifically, from about 60 to about 100 pounds (oven dry basis) of Aracruz ECF, a *eucalyptus* hardwood kraft ("EHWK") pulp (Aracruz, Rio de Janeiro, RJ, Brazil) was dispersed in a pulper at 100° F. for 25 minutes at a consistency of 3 percent before being transferred in equal parts to two machine chests and diluted to a consistency of 1 percent. When used, Hercobond 1366 was weighed out and diluted to a 1 percent actives solution with water prior to being added to the machine chest. The fiber slurry and chemical was allowed to mix for five minutes prior to the stock solution being sent to the headbox.

Forty pounds (oven dry basis) of northern softwood kraft fiber ("NSWK") (or bamboo pulp when used) were dispersed in a pulper at 100° F. for 25 minutes at a consistency of 3 percent before being transferred to a second machine chest and diluted to 1 percent consistency. The softwood fibers may be refined after pulping and prior to transfer to the machine chest as noted in examples.

To produce a layered tissue web, prior to forming each stock was further diluted to approximately 0.1 percent consistency and transferred to a 3-layer headbox in such a manner as to provide a layered sheet. The fiber composition of the layered sheets are described in the table below. Generally, the outer layers comprised EHWK and the inner layer comprised NSWK, bamboo fibers or a mixture of both.

Blended tissue webs were produced as described above.

The formed web was non-compressively dewatered and rush transferred to a transfer fabric traveling at a speed about 25 percent slower than the forming fabric. The web was then transferred to a throughdrying fabric and dried. Samples 11-15 were converted into rolled products to produce single ply bath tissue products. Samples were produced as described in Table 4, below.

TABLE 4

| Sample | Basis Weight (gsm) | Web Structure | Basesheet or Finished Product | Plies | NSWK (wt %) | EHWK (wt %) | Bamboo (wt %) |
|---|---|---|---|---|---|---|---|
| 11 | 27.1 | Layered | Finished | 1 | 35 | 65 | 0 |
| 12 | 27.1 | Layered | Finished | 1 | 25 | 65 | 10 |
| 13 | 27.1 | Layered | Finished | 1 | 10 | 65 | 25 |
| 14 | 27.1 | Layered | Finished | 1 | 0 | 65 | 35 |
| 15 | 27.1 | NA | Finished | 1 | 0 | 0 | 100 |
| 16 | 27.1 | NA | Finished | 1 | 0 | 100 | 0 |
| 17 | 36.5 | NA | Basesheet | 1 | 0 | 100 | 0 |
| 18 | 36.5 | Layered | Basesheet | 1 | 0 | 60 | 40 |
| 19 | 36.5 | Layered | Basesheet | 1 | 40 | 60 | 0 |
| 20 | 36.5 | NA | Basesheet | 1 | 0 | 100 | 0 |
| 21 | 36.5 | Layered | Basesheet | 1 | 0 | 50 | 50 |
| 22 | 36.5 | Layered | Basesheet | 1 | 0 | 60 | 40 |
| 23 | 36.5 | Layered | Basesheet | 1 | 40 | 60 | 0 |
| 24 | 36.5 | Layered | Basesheet | 1 | 40 | 60 | 0 |
| 25 | 36.5 | Layered | Basesheet | 1 | 0 | 60 | 40 |

Example 3

Uncreped Through-Air Dried Towels Comprising Bamboo

A single ply uncreped through-air dried (UCTAD) tissue web was made generally in accordance with U.S. Pat. No. 5,607,551.

More specifically, from about 50 to about 90 pounds (oven dry basis) of Aracruz ECF, a EHWK pulp (Aracruz, Rio de Janeiro, RJ, Brazil) was dispersed in a pulper for 25 minutes with from about 10 to about 50 pounds of bleached chemithermo mechanical pulp ("BCTMP") at a consistency of 3 percent before being transferred in equal parts to three machine chests and diluted to a consistency of 1 percent.

Forty pounds (oven dry basis) of NSWK pulp (or bamboo pulp when used) was dispersed in a pulper for 25 minutes at a consistency of 3 percent and refined at between 1 and 5 horsepower tons/day before being transferred in equal parts to the three machine chests containing the EHWK and BCTMP fibers. The machine chests were then diluted to a consistency of 1 percent. Kymene 920A was added to each machine chest at the rate of 1 percent dry actives to oven dried basis of total pulp. The stock solutions were then passed in equal amounts to a 3-layer headbox after dilution to 0.75 percent consistency to form a blended sheet.

The formed web was non-compressively dewatered and rush transferred to a transfer fabric traveling at a speed about 25 percent slower than the forming fabric. The web was then transferred to a throughdrying fabric, dried and calendared. Samples were produced as described in Table 5, below.

TABLE 5

| Sample | Single Ply Basis Weight (gsm) | Web Structure | Plies | Bamboo (wt %) | NSWK (wt %) | EHWK (wt %) | BCTMP (wt %) |
|---|---|---|---|---|---|---|---|
| 26 | 39.0 | Blended | 1 | 0 | 50 | 25 | 25 |
| 27 | 39.0 | Blended | 1 | 70 | 0 | 5 | 25 |

Web Strength and Bulk

The effect of bamboo on various tissue strength and durability properties was explored by preparing samples using several levels of bamboo. Table 6 summarizes the physical properties of basesheets prepared as described above. Table 7 summarizes the physical properties of finished produce prepared as described above.

TABLE 6

| Sample | Single Ply Basis Weight (gsm) | Plies | Bamboo Total Web (wt %) | Bulk (cm³/g) | GMT (g/3") | TEA Index | CD TEA (g·cm/cm²) |
|---|---|---|---|---|---|---|---|
| 1 | 15.1 | 2 | 0 | 9.5 | 924 | 10.3 | 3.6 |
| 2 | 15.1 | 2 | 0 | 11.3 | 1235 | 10.2 | 4.9 |
| 3 | 15.1 | 2 | 30 | 9.0 | 1158 | 9.3 | 3.9 |
| 4 | 15.1 | 2 | 40 | 8.9 | 1116 | 10.1 | 4.8 |
| 5 | 16.7 | 1 | 0 | 9.7 | 1061 | 15.0 | 6.6 |
| 6 | 16.7 | 1 | 0 | 10.4 | 656 | 15.8 | 4.3 |
| 7 | 16.7 | 1 | 0 | 9.3 | 728 | 12.7 | 3.8 |
| 8 | 16.7 | 1 | 0 | 9.3 | 1024 | 12.4 | 5.2 |
| 9 | 16.7 | 1 | 40 | 9.1 | 1158 | 11.2 | 5.5 |
| 10 | 16.7 | 1 | 40 | 9.2 | 758 | 12.6 | 4.3 |
| 11 | 27.1 | 1 | 0 | 9.4 | 625 | 8.5 | 3.3 |
| 12 | 27.1 | 1 | 10 | 9.8 | 769 | 8.9 | 4.2 |
| 13 | 27.1 | 1 | 25 | 10.9 | 557 | 8.5 | 3.2 |
| 14 | 27.1 | 1 | 35 | 10.1 | 662 | 9.3 | 4.2 |
| 15 | 27.1 | 1 | 100 | 10.3 | 954 | 10.1 | 6.5 |
| 16 | 27.1 | 1 | 0 | 9.8 | 857 | 8.1 | 5.0 |
| 17 | 36.5 | 1 | 0 | 21.2 | 1160 | 11.2 | 8.8 |
| 18 | 36.5 | 1 | 40 | 21.9 | 1089 | 13.3 | 10.1 |
| 19 | 36.5 | 1 | 0 | 20.4 | 1051 | 12.0 | 8.9 |
| 20 | 36.5 | 1 | 0 | 22.1 | 1056 | 12.0 | 8.7 |
| 21 | 36.5 | 1 | 50 | 21.5 | 968 | 13.3 | 10.5 |
| 22 | 36.5 | 1 | 40 | 21.0 | 1167 | 13.6 | 13.7 |
| 23 | 36.5 | 1 | 0 | 19.8 | 1160 | 13.4 | 9.6 |
| 24 | 36.5 | 1 | 0 | 20.5 | 1248 | 14.7 | 11.3 |
| 25 | 36.5 | 1 | 40 | 22.0 | 1136 | 13.0 | 10.2 |
| 26 | 39.0 | 1 | 0 | 20.8 | 2738 | 10.9 | 17.7 |
| 27 | 39.0 | 1 | 70 | 22.6 | 1616 | 10.1 | 12.5 |

The relative change in bulk (Delta Bulk %), compared to a control to an identical control containing NBSK in place of bamboo, is summarized in the table below.

TABLE 7

| Sample | Basis Weight (gsm) | Web Structure | Plies | Method of Manufacture | Bamboo Total Web (wt %) | Bulk (cm³/g) | Delta Bulk (%) |
|---|---|---|---|---|---|---|---|
| 3 | 15.1 | Layered | 2 | CWP | 30 | 9.0 | −4.5% |
| 4 | 15.1 | Layered | 2 | CWP | 40 | 8.9 | −21.4% |
| 9 | 16.7 | Blended | 1 | CWP | 40 | 9.1 | −6.2% |
| 10 | 16.7 | Blended | 1 | CWP | 40 | 9.2 | −11.7% |
| 12 | 27.1 | Layered | 1 | UCTAD | 10 | 9.8 | 3.5% |
| 13 | 27.1 | Layered | 1 | UCTAD | 25 | 10.9 | 15.1% |
| 14 | 27.1 | Layered | 1 | UCTAD | 35 | 10.1 | 7.1% |
| 15 | 27.1 | Blended | 1 | UCTAD | 100 | 10.3 | 9.4% |
| 18 | 36.5 | Layered | 1 | UCTAD | 40 | 21.9 | 7.6% |
| 21 | 36.5 | Layered | 1 | UCTAD | 50 | 21.5 | 8.6% |
| 22 | 36.5 | Layered | 1 | UCTAD | 40 | 21.0 | 5.9% |
| 25 | 36.5 | Layered | 1 | UCTAD | 40 | 22.0 | 7.3% |
| 27 | 39.0 | Blended | 1 | UCTAD | 70 | 22.6 | 8.7% |

Web Softness and Durability

The effect of bamboo on the durability (Durability Index) and softness (Stiffness Index) of the tissue web was explored by preparing samples using several levels of bamboo, the results of which are summarized below.

TABLE 8

| Sample | Basis Weight (gsm) | Web Structure | Plies | Bamboo Total Web (wt %) | Tear Index | Stiffness Index | Durability Index |
|---|---|---|---|---|---|---|---|
| 1 | 15.1 | Layered | 2 | 0 | 10.3 | 9.4 | 24.3 |
| 2 | 15.1 | Layered | 2 | 0 | 10.2 | 10.0 | 23.2 |
| 3 | 15.1 | Layered | 2 | 30 | 9.3 | 12.7 | 19.8 |
| 4 | 15.1 | Layered | 2 | 40 | 10.1 | 13.0 | 21.2 |
| 5 | 16.7 | Blended | 1 | 0 | 15.0 | 9.1 | 30.2 |
| 6 | 16.7 | Blended | 1 | 0 | 15.8 | 8.4 | 33.1 |
| 7 | 16.7 | Blended | 1 | 0 | 12.7 | 8.6 | 23.5 |
| 8 | 16.7 | Blended | 1 | 0 | 12.4 | 9.3 | 20.5 |
| 9 | 16.7 | Blended | 1 | 40 | 11.2 | 10.2 | 20.6 |
| 10 | 16.7 | Blended | 1 | 40 | 12.6 | 13.3 | 27.3 |
| 11 | 27.1 | Layered | 1 | 0 | 8.49 | 10.9 | 25.6 |
| 12 | 27.1 | Layered | 1 | 10 | 8.92 | 10.1 | 25.8 |
| 13 | 27.1 | Layered | 1 | 25 | 8.46 | 11.4 | 23.9 |
| 14 | 27.1 | Layered | 1 | 35 | 9.34 | 11.3 | 23.9 |
| 15 | 27.1 | Blended | 1 | 100 | 10.08 | 11.6 | 28 |
| 16 | 27.1 | Blended | 1 | 0 | 8.1 | 11.6 | 20.5 |
| 17 | 36.5 | NA | 1 | 0 | 11.2 | 6.0 | 27.1 |
| 18 | 36.5 | Layered | 1 | 40 | 13.3 | 5.3 | 33.5 |
| 19 | 36.5 | Layered | 1 | 0 | 12.0 | 4.9 | 31.9 |
| 20 | 36.5 | NA | 1 | 0 | 12.0 | 6.6 | 29.2 |
| 21 | 36.5 | Layered | 1 | 50 | 13.3 | 5.3 | 34.9 |
| 22 | 36.5 | Layered | 1 | 40 | 13.6 | 5.8 | 33.6 |
| 23 | 36.5 | Layered | 1 | 0 | 13.4 | 4.8 | 34.2 |
| 24 | 36.5 | Layered | 1 | 0 | 14.7 | 4.9 | 37.4 |
| 25 | 36.5 | Layered | 1 | 40 | 13.0 | 5.5 | 33.9 |
| 26 | 39.0 | Blended | 1 | 0 | 10.9 | 4.7 | 31.8 |
| 27 | 39.0 | Blended | 1 | 70 | 10.1 | 7.5 | 31.6 |

The relative change in the Durability Index and Stiffness Index, compared to an identical control containing NBSK in place of bamboo, is summarized in the table below.

TABLE 9

| Sample | Single Ply Basis Weight (gsm) | Web Structure | Plies | Method of Manufacture | Bamboo Total Web (wt %) | Delta Durability Index (%) | Delta Stiffness Index (%) |
|---|---|---|---|---|---|---|---|
| 3 | 15.1 | Layered | 2 | CWP | 30 | −20.1% | 32.6% |
| 4 | 15.1 | Layered | 2 | CWP | 40 | −12.9% | 30.2% |
| 9 | 16.7 | Blended | 1 | CWP | 40 | −31.7% | 31.6% |
| 10 | 16.7 | Blended | 1 | CWP | 40 | −17.6% | 43.0% |
| 12 | 27.1 | Layered | 1 | UCTAD | 10 | 0.6% | 0.4% |
| 13 | 27.1 | Layered | 1 | UCTAD | 25 | −6.5% | −2.2% |
| 14 | 27.1 | Layered | 1 | UCTAD | 35 | −6.7% | 10.4% |
| 15 | 27.1 | Blended | 1 | UCTAD | 100 | 9.2% | 9.9% |
| 18 | 36.5 | Layered | 1 | UCTAD | 40 | 5.1% | 7.1% |
| 21 | 36.5 | Layered | 1 | UCTAD | 50 | 2.0% | 11.1% |
| 22 | 36.5 | Layered | 1 | UCTAD | 40 | −1.6% | 20.4% |
| 25 | 36.5 | Layered | 1 | UCTAD | 40 | −9.3% | 12.2% |
| 27 | 39.0 | Blended | 1 | UCTAD | 70 | −0.4% | 61.4% |

While tissue webs and products comprising the same have been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

I claim:

1. A tissue product comprising at least one through air dried tissue web comprising from about 10 to about 70 percent, by weight of the web, bamboo fibers, the product having a basis weight from about 25 to about 40 grams per meter squared (gsm), a Bulk greater than about 10 cubic centimeters per gram (cc/g) and a geometric mean tensile (GMT) from about 500 to about 1000 g/3".

2. The tissue product of claim 1 having a Stiffness Index less than about 12 and Durability Index greater than about 20.

3. The tissue product of claim 1 having a Stiffness Index from about 8 to about 10 and a Durability Index from about 20 to about 25.

4. The tissue product of claim 1 wherein the at least one through air dried tissue web comprises from about 15 to about 40 percent bamboo fibers.

5. The tissue product of claim 1 having a CD TEA greater than about 4.0 g·cm/cm².

6. The tissue product of claim 1 having a TEA Index greater than about 8.

7. The tissue product of claim 1 wherein the at least one through air dried tissue web comprises from about 15 to about 40 percent bamboo fibers, and wherein the tissue product has a TEA Index from about 8 to about 12 and Stiffness Index less than about 12.

8. The tissue product of claim 7 wherein the at least one through air dried tissue web comprises less than about 10 percent softwood fibers.

9. The tissue product of claim 7 wherein the at least one through air dried tissue web comprises less than about 2 percent softwood fibers.

10. A tissue product comprising at least one through air dried tissue web comprising from about 10 to about 70 percent, by weight of the web, bamboo fibers, the product having a basis weight from about 35 to about 60 grams per meter squared (gsm), a Bulk greater than about 15 cubic centimeters per gram (cc/g) and a geometric mean tensile (GMT) from about 1500 to about 3000 g/3".

11. The tissue product of claim 10 having a Stiffness Index less than about 10 and Durability Index greater than about 25.

12. The tissue product of claim 10 having a Stiffness Index from about 4 to about 8 and a Durability Index from about 30 to about 35.

13. The tissue product of claim 10 wherein the at least one through air dried tissue web comprises from about 15 to about 40 percent bamboo fibers.

14. The tissue product of claim 10 having a CD TEA greater than about 8.0 g·cm/cm².

15. The tissue product of claim 10 having a TEA Index greater than about 10.

16. The tissue product of claim 10 wherein the at least one through air dried tissue web comprises from about 15 to about 40 percent bamboo fibers, and wherein the tissue product has a TEA Index from about 10 to about 15 and Stiffness Index from about 4 to about 8.

17. The tissue product of claim 16 wherein the at least one through air dried tissue web comprises less than about 10 percent softwood fibers.

18. The tissue product of claim 16 wherein the at least one through air dried tissue web comprises less than about 2 percent softwood fibers.

19. A through air dried tissue product comprising from about 15 to about 40 percent, by weight, bamboo fibers and less than about 10 percent, by weight, softwood fibers, the product having a basis weight from about 35 to about 60 grams per meter squared (gsm), a Bulk greater than about 15 cubic centimeters per gram (cc/g) and a Stiffness Index less than about 10.

20. The through air dried tissue product of claim 19 having a Durability Index greater than about 25.

* * * * *